United States Patent [19]

Wilks

[11] Patent Number: 5,027,635

[45] Date of Patent: Jul. 2, 1991

[54] CHANNEL HOT-FORMING APPARATUS

[75] Inventor: Robert S. Wilks, Loveland, Ohio

[73] Assignee: General Electric Company, San Jose, Calif.

[21] Appl. No.: 576,760

[22] Filed: Sep. 4, 1990

[51] Int. Cl.$^5$ ............................................... B21D 39/20
[52] U.S. Cl. ..................................... 72/342.7; 72/364; 72/370
[58] Field of Search ..................... 72/113, 342.1, 342.7, 72/353.4, 364, 370; 148/130, 131

[56] References Cited

U.S. PATENT DOCUMENTS

| | | | |
|---|---|---|---|
| 2,461,839 | 2/1949 | Neutelings | 72/208 |
| 3,205,691 | 9/1965 | Stegler | 72/364 |
| 3,640,116 | 2/1972 | Hellman | 72/370 |
| 4,337,634 | 7/1982 | Strudel | 72/370 |
| 4,604,785 | 8/1986 | Eddens | 72/342.7 |

Primary Examiner—Lowell A. Larson
Attorney, Agent, or Firm—R. R. Schroeder

[57] ABSTRACT

Apparatus for thermal sizing elongated, tubular channels of a square cross section includes a die having plural elongated die elements and an elongated mandrel having a frame mounting plural pairs of rollers distributed along its length on all four sides. The die is inserted in the channel with its die elements disposed adjacent the channel corners. The mandrel is then inserted with its roller pairs peripherally engaging the die elements, pressing them against the channel corners. The channel, die and mandrel are then heated to a hot-forming temperature, thermally expanding the mandrel frame into pressing engagement with the die elements in lieu of the rollers to plastically reform the channel to a stable shape free of geometric irregularities.

20 Claims, 3 Drawing Sheets

CHANNEL HOT-FORMING APPARATUS

The present invention relates to metal forming apparatus and particularly to apparatus for correcting geometric irregularities in elongated, tubular channels.

BACKGROUND OF THE INVENTION

There are numerous components of industrial and utility equipment whose dimensional and geometric characteristics are of a critical nature and therefore must be manufactured to extremely strict specifications. A notable example of one such critical component is the flow channel of a nuclear fuel assembly or bundle, such as disclosed in U.S. Pat. No. 3,689,358. These channels are elongated tubular components of square cross section, which may measure approximately 6 inches on each side and on the order of 14 feet in length. Typically, the channels are created by seam welding two U-shaped channel sections together. The preferred material is a zirconium alloy, such as Zircaloy, on the order of 125 mils thick. It is imperative that these flow channels are manufactured to the proper dimensions and be free of geometric irregularities, such as face or side bulge, out-of-square cross section, non-parallelism of sides, longitudinal bow and twist, and the like. Unfortunately, the channel creating step leaves residual geometric irregularities. Thus as a final manufacturing step, the channels must undergo thermal sizing to eliminate these irregularities.

The thermal sizing step involves inserting an elongated, close-fitting mandrel into the channel and raising the temperature of the channel to about 1100° F. in an inert atmosphere. The mandrel is expanded into engagement with the channel, causing the channel to yield plastically to the specified final form. Typically, the outwardly directed mandrel forces are exerted solely on the four corners of the channel throughout their lengths. When the channel is returned to room temperature, the mandrel is withdrawn, leaving the channel in a stable form substantially free of geometric irregularities. It has been found that mandrel insertion is sometimes quite difficult due to the fact that certain irregularities produce sliding friction between the channel and the mandrel as the latter progresses into the channel passage. A particularly serious problem, however, is scoring of the interior corner surfaces inflicted during mandrel insertion, mandrel withdrawal, and/or relative movements of the mandrel and channel surfaces during the heat-up/cool down cycle due to differential thermal expansion. Such surface blemishes have been found to be a source of future corrosion in the harsh environment of a nuclear reactor core, and therefore must be avoided.

It is accordingly an object of the present invention to provide improved hot-forming apparatus for the thermal sizing of elongated tubular channels to remove geometric irregularities therefrom.

A further object is to provide hot-forming apparatus of the above-character, wherein the forces required to insert and withdraw a hot-forming mandrel from the channel passage are significantly reduced.

Another object is proved hot-forming apparatus of the above-character wherein scoring of the channel interior surface is largely avoided.

An additional object is to provide hot-forming apparatus of the above-character, which utilizes an improved mandrel for developing the channel forming forces.

Other objects of the invention will in part be obvious and in part appear hereinafter.

SUMMARY OF THE INVENTION

In accordance with the present invention, there is provided improved hot-forming apparatus for removing geometric irregularities in elongated, tubular channels of rectangular cross-section. The apparatus includes a die having a plurality of elongated die elements loosely captured between upper and lower tie plates. The die is inserted in the channel passage with a die element situated in contiguous, coextensive relation with each corner of the channel. The apparatus further includes an elongated mandrel having a frame for journalling plural pairs of rollers distributed along the mandrel length on all four sides. The mandrel frame also provides bearing surfaces in proximate relation to the roller peripheral surfaces at the frame corners.

When the mandrel is inserted in the channel passage, the rollers ride on the die elements to press them into the channel corners thereby elastically reforming the channel approximately to the specified geometry. To reduce loading on the roller journals, the rollers of each pair are in constant peripheral interengagement so as to transfer balanced channel reforming forces between opposed die elements directly through the rollers, rather than through the frame.

Once the mandrel is fully inserted in the mandrel passage, an effort greatly facilitated by the rollers, the assembly of channel, die and mandrel is heated to an appropriate hot-forming temperature. During temperature runup, the mandrel is expanded to move its bearing surfaces outwardly into pressing engagement with the die elements in lieu of the rollers. That is, the rollers are effectively retracted, such the ultimate loading to plastically reform the channel to the specified geometry free of irregularities is borne solely by the bearing surfaces. In accordance with a feature of the present invention, mandrel expansion is produced by the thermal growth of its frame which is formed of metal having a greater temperature coefficient of expansion than that of the channel. As an additional feature, the journal mountings of the rollers to the frame incorporate a material having a low temperature coefficient of expansion. Thus, the frame bearing surfaces expand from positions below the roller peripheries at room temperature to positions beyond the roller peripheries at the hot-forming temperature in assuming the channel reforming loads from the rollers. When the assembly is returned to room temperature, the frame bearing surfaces recede to their original positions, leaving the rollers to facilitate withdrawal of the mandrel.

The invention accordingly comprises the features of construction, combination of elements and arrangement of parts, all of which as described below, and the scope of the invention will be indicated in the attached claims.

For a full understanding of the nature and objects of the present invention, reference may be had to the following Detail Description taken in connection with the accompanying drawings, in which.

Corresponding reference numerals refer to like parts throughout the several views of the drawings.

DETAILED DESCRIPTION

Figure 1:
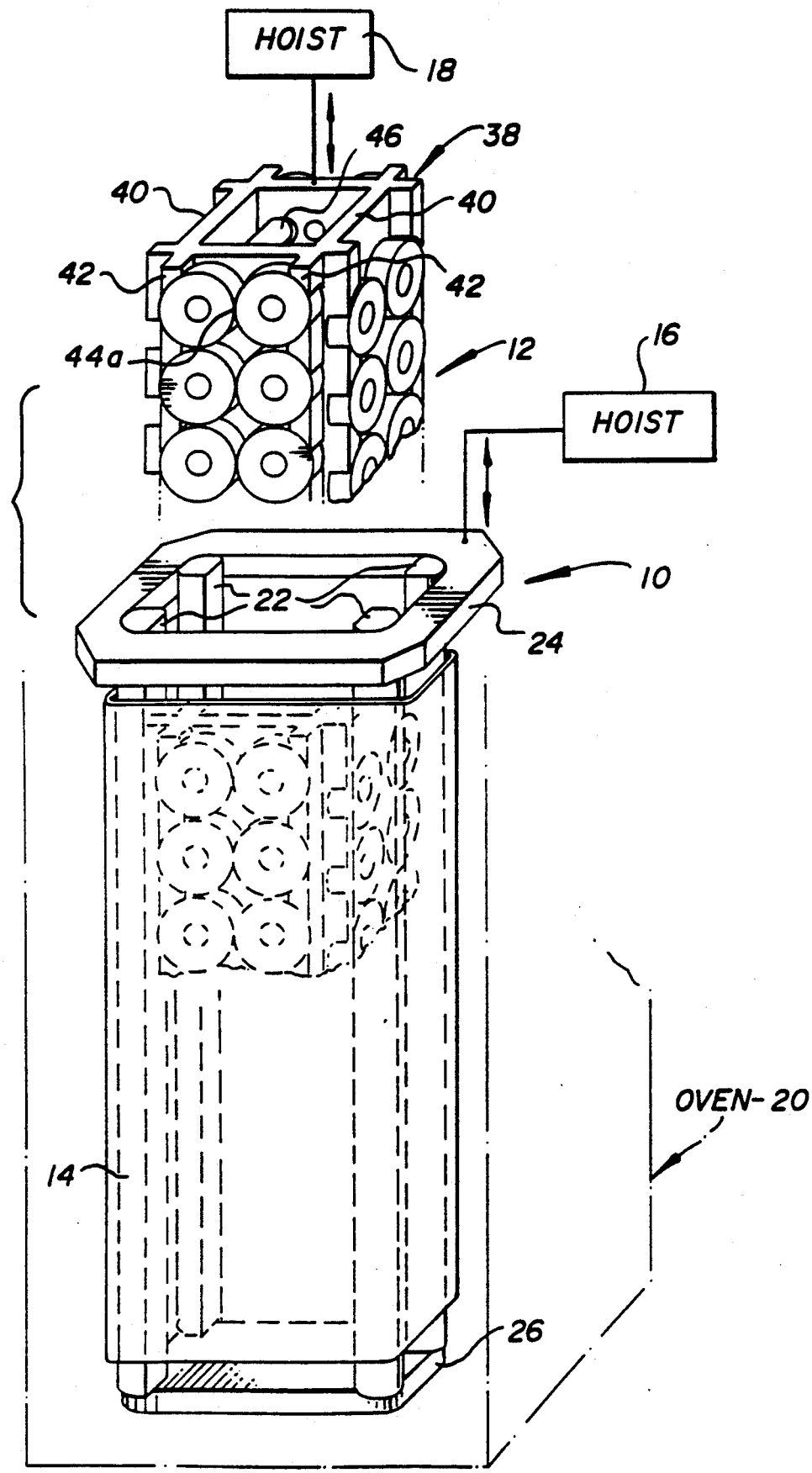
FIG. 1 is a perspective view, partially broken away and partially in schematic form, of hot forming apparatus constructed in accordance with the present invention to remove geometric irregularities from elongated, tubular channels.

The hot-forming apparatus of the present invention includes, as seen in FIG. 1, a die, generally indicated at 10, and a mandrel, generally indicated at 12, which are inserted in the passage of a tubular channel 14 to remove any geometric irregularities therein. The die is inserted first, either manually or preferably by means of a suitable lifting means, such as a hoist, schematically indicated at 16. The mandrel is then inserted in to the open interior of the die by a hoist, schematically indicated at 18, assuming the mandrel weight is sufficient to achieve full insertion by force of gravity. The lengths of the die and mandrel are at least equal to the channel length, and thus, in their fully inserted positions, these components are in co-extensive relation with the channel.

The hot forming process is carried out in an oven 20 at appropriate elevated temperatures. In the application of the apparatus to thermal sizing flow channels utilized in nuclear fuel assemblies, the channel, die and mandrel assembly would be run up to approximately 1100° F. in an inert atmosphere, such as argon, to prevent oxidation of the channel material, typically a zirconium alloy such as Zircaloy.

Figure 2:
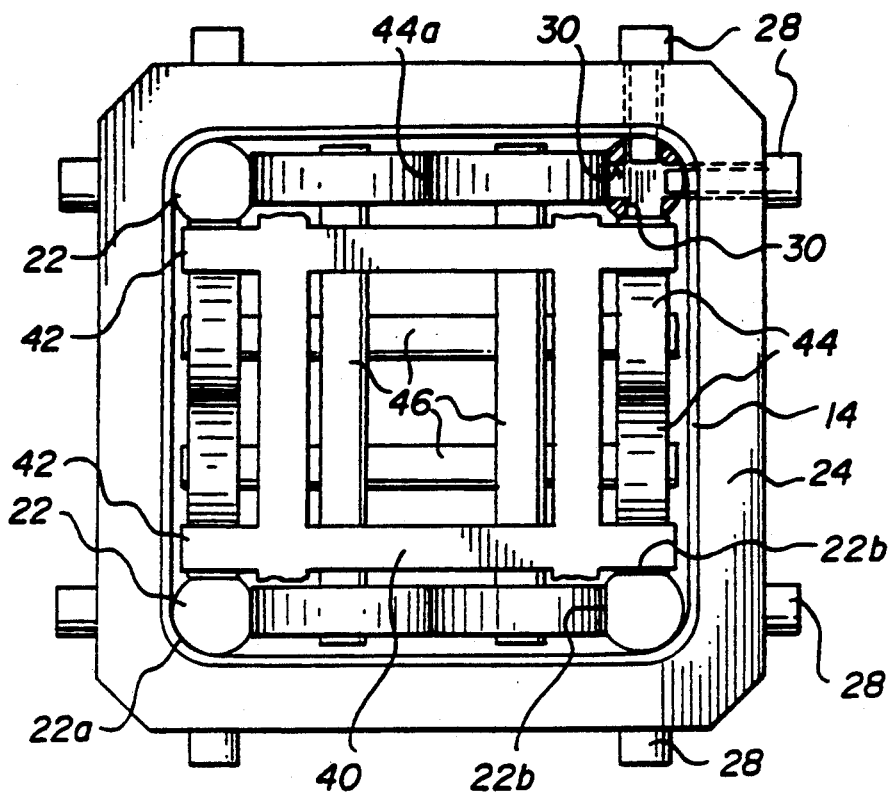
FIG. 2 is a top view, partially broken away, of the apparatus in FIG. 1.
Figure 3:
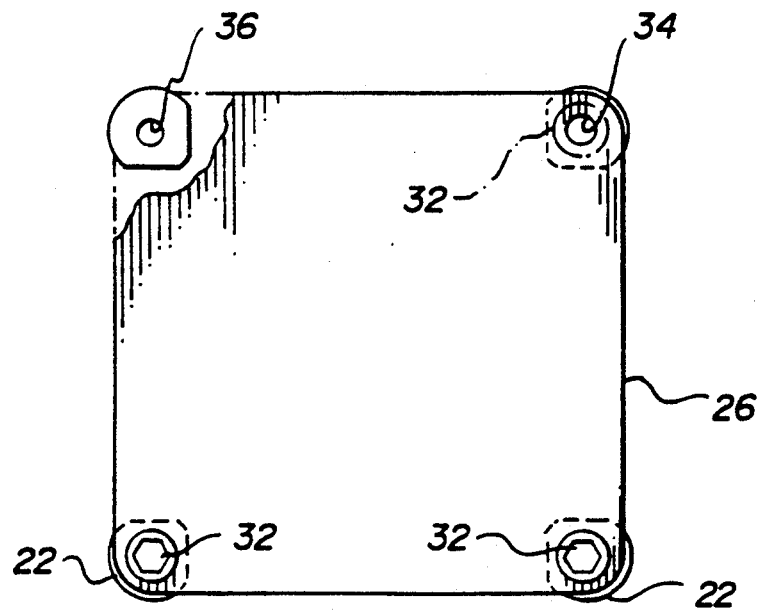
FIG. 3 is a bottom view of the apparatus of FIG. 1.

Referring jointly to FIGS. 1-3, die 10 includes four elongated die elements 22, one for each corner of channel 14, loosely captured at their upper ends by an open rectangular tie plate 24 and at their lower ends by a lower tie plate 26. As best seen in FIG. 2, pairs of bolts 28 are threaded through the upper tie plate at a right angles, with their tips penetrating transverse, bores 30 drilled through the die elements, also at right angles. Adequate clearance is provided between the bolt tips and the bores to loosely hold the upper ends of the die elements to tie plate 24 in a limited, floating manner. Similarly, as seen in FIG. 3, bolts 32 pass freely through holes 34 in lower tie plate 26 and into threaded engagement with tapped longitudinal bores 36 in the lower ends of the die elements 22. The bolts bottom out in these bores before the tie plate can be clamped between the die element ends and the bolt heads. With ample clearance between the bolts and the tie plate holes, the die elements are loosely held to the lower tie plate. By virtue of the die elements being floatingly mounted to the tie plates, they can readily assume positions contiguous to the channel corners during insert and withdrawal without binding or scoring of the channel interior surface along the corners thereof.

Each die element is of a quarter-round cross section having a curved die surface 22a conforming to the channel corner geometry and a pair of flat bearing surfaces 22b at a right angle to each other and arranged essentially normal to their adjacent channel sidewalls upon die insertion. These die and bearing surfaces are both continuous and coextensive with the die element length. The die elements are of a suitable metal, such as 304 series stainless steel.

Figure 4:
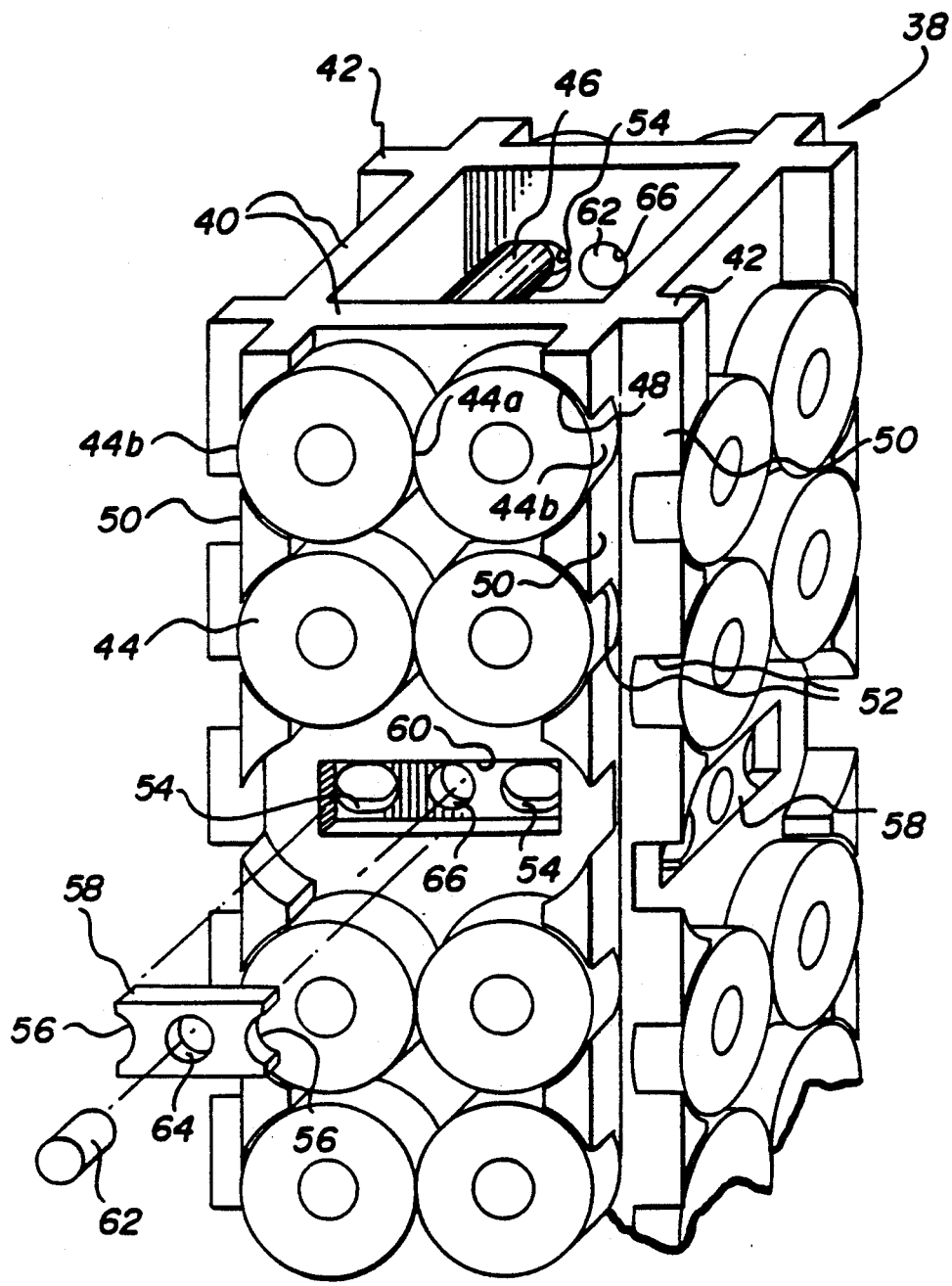
FIG. 4 is a fragmentary perspective view, partially exploded, of the mandrel utilized in the apparatus of FIG. 1.

Mandrel 12, as seen in FIGS. 1, 2 and 4, includes an elongated metallic frame, generally indicated at 38, having a grid-like cross section resembling a tick-tack-toe configuration. Thus, the frame includes four right angle intersecting sidewalls 40 terminating in ribs 42 projecting beyond the intersections. Journalled in each sidewall are rollers 44 transversely arranged in paired relation and distributed in pairs along the entire length of the frame on all four sides. The roller pairs on opposite sides of the frame are mounted on the ends of pairs of axles 46 extending through journals provided in the opposed side walls 40. The roller pairs at adjacent sides are vertically staggered to accommodate the crisscrossing axles. As an important feature of the present invention, the rollers of each pair are in peripheral contact with each other, i.e., in rolling interengagement as indicated at 44a in FIG. 1. As best seen in FIG. 4, ribs 42 are relieved, as indicated at 48, to accommodate rollers 44; these reliefs breaking out into rib surfaces 50 to provide openings 52 through which the roller peripheries protrude. At room temperature, the roller peripheries, indicated at 44b, protrude slightly beyond rib surfaces 50. It will be noted that the roller peripheries at 44b of each roller pair are in transversely aligned, diametrically opposed relation to their rolling interengagement peripheries at 44a.

Still referring to FIG. 4, the roller axles 46 are journalled in complementing oblong holes 54 in frame sidewalls 40 and journal half-sections 56 cut in the opposed ends of transversely elongated bars 58. These bars are set in recesses 60 formed in the sidewalls and fixed in position by locating pins 62 press-fitted in holes 64 and 66 in the bars and the sidewalls, respectively. At room temperature, the roller axles 46 are journalled between bar journal sections 56 and the outer semi-circular portions of the oblong sidewall holes 54. As such, the rollers are positioned with their peripheries 44b protruding slightly beyond rib surfaces 50, as noted above. Frame 38 is formed of a metal having a relatively high thermal coefficient of expansion, such as a 304 series stainless steel. Bars 58 and rollers 44, on the other hand, are formed of a relatively low thermal coexpansion metal, such as Zircaloy. The significance of these material choices will be detailed below.

To carry out a hot-forming process utilizing the above-described apparatus of the invention, a channel 14 to be thermal sized is placed upright in oven 20, and die 10 is inserted in the channel passage using hoist 16. The floating nature of the die elements 22, carried between the upper and lower tie plates, allows them to freely assume positions contiguous with the channel corners as insertion progresses. Since insertion does not produce any significant transverse forces on the die elements, scoring of the channel corner surfaces is avoided. This is in contrast to prior hot-forming apparatus, wherein, the die elements were rigidly mounted to a mandrel. Once the die is fully inserted, die surfaces 22a (FIG. 2) are in coextensive confronting relation with the interior corner surfaces of the channel to present curved surfaces conforming to the specified channel corner radius.

Mandrel 12 is then inserted into the open interior of the die using hoist 18. During initial insertion, the protruding peripheries 44b of rollers 44 at the leading, lower end of the mandrel engage and roll along the flat bearing surfaces 22b of the die elements to press the die elements into the channel corners. As insertion continues, the channel is elastically deformed by the mandrel to progressively diminish any geometric irregularities. For those irregularities that impose balanced loads on the mandrel rollers, such as channel bulge, the forces are transferred directly between opposed die elements by virtue of the rolling interengagement between rollers at 44a. The roller axle and bearing design requirements can thus be relaxed to accommodate a lighter weight construction. It will be appreciated that only the leading several roller pairs at the lower end of the mandrel do most of the channel shaping work, while the remaining roller pairs merely sustain the new channel shape. Thus, by virtue of the mandrel rollers, the requisite forces to fully insert the mandrel should remain substantially constant at a significantly lower average magnitude than has heretofore been the case.

Once the mandrel is fully inserted into coextensive relation with the die and mandrel, the oven is closed. The oven is purged of air, and an inert gas, such as argon, is introduced. The oven temperature is then raised to a suitable hog-forming temperature, e.g., 1100° F. in the case of a Zircaloy channel. During the heat-up cycle, the stainless steel mandrel frame 30 expands at a considerably faster rate than the channel. Thus, the frame bearing surfaces 50 (FIG. 4) thermally grow outwardly into bearing engagement with the die element bearing surfaces 22b to begin pressing the die surfaces 2a against the channel corners to a greater extent than did the mandrel rollers. Concurrently, the sidewall holes 54 journalling the roller axles also grow outwardly at a considerably faster rate than the Zircaloy bars 58 elongate. As a consequence, the frame bearing surfaces 50 eventually expand outwardly beyond the roller peripheries at 44b. The rollers are thus, in effect, progressively retracted from positions beyond to positions below the bearing surfaces 50 during the heat-up cycle. Once the roller peripheries recede below the mandrel bearing surfaces, the mandrel load exerted on the channel via the die is transferred off the rollers and onto the mandrel frame. This feature further reduces the structural requirements of the roller axles and journals. With appropriate dimensioning of the components, this load transfer can be made to occur at temperatures well below the ultimate hot-forming temperature, e.g. 800° F. or less, which would permit the incorporation of rolling element bearings in axle-to-frame or axle-to-roller journals to further reduce mandrel insertion forces.

When the oven temperature reaches the hot-forming temperature of 1100° F., the mandrel frame is fully expanded to plastically deform the channel to its specified final shape, free of geometric irregularities. The oven is then cooled down to room temperature. During this cool-down cycle, the mandrel frame contracts, and the bearing surfaces 50 recede. The journal sections 56 of bars 58 and frame holes 54 close on the roller axles 46 to mount the rollers 44 with their peripheries at 44a protruding beyond the frame bearing surfaces. Thus, when the mandrel returns to room temperature, the rollers are in position to facilitate mandrel withdrawal by driver 18. The die is then removed by hoist 16, leaving the channel thermally sized to a stable, final shape, corrected for all geometric irregularities.

From the foregoing description, it is seen that the present invention provides hot-forming apparatus that includes a "wheeled" mandrel to substantially reduce the insertion and withdrawal force requirements. Moreover, the mandrel rollers serve as rolling guides to accommodate less design clearance between the frame bearing surfaces 50 and the die element bearing surfaces 22b. Thus, the thermal expansion capacity of the mandrel frame can be more fully utilized during the heat-up cycle to hot-form a channel to its final geometry. The retractable nature of the roller mountings and the capability of transferring balanced loadings between opposed die elements directly between roller pairs substantially reduces the strength requirements of the roller journals at room and elevated temperatures. Moreover, the loose mountings of the die elements accommodates facile insertion and withdrawal of the die without scoring the channel surface.

While it is preferred to utilize thermal growth as the sole means of mandrel expansion, it will be appreciated that the hot-forming mandrel could be expanded by other means supplementing or in lieu of thermal expansion, e.g. a wedging or levering action.

It is seen from the foregoing that the objects set forth above, including those made apparent from the above Detailed Description, are efficiently attained, and, since certain changes may be made in the construction set forth without departing from the scope of the invention, it is intended that matters of detail be taken as illustrative and not in a limiting sense.

Having described the invention, what is claimed as new and desired to secure by Letters Patent is:

1. Apparatus for removing geometric irregularities in an elongated, tubular channel having a plurality of substantially flat sides joined at corners to define a central passage, said apparatus comprising, in combination:
    A. a die including a plurality of elongated die elements, said die being inserted in the channel passage with one of said die elements disposed in contiguous, coextensive relation with each channel corner, each said die element having
        1) a die surface confronting the contiguous one of the channel corners, and
        2) first bearing surfaces faced away from the contiguous channel corner;
    B. an elongated mandrel for insertion in the channel passage, said mandrel including
        1) a frame,
        2) a plurality of rollers mounted by said frame in positions to make rolling, peripheral engagement with said first bearing surfaces during mandrel insertion, said rollers pressing said die surfaces against the channel corners to elastically reform the channel in a manner to diminish the geometric irregularities, and
        3) second bearing surfaces formed on said frame in positions closely spaced relative to said first bearing surfaces during mandrel insertion; and
    C. means for heating the channel and said mandrel to produce thermal expansion of said frame sufficient to move said second bearing surfaces into engagement with said first bearing surfaces and to further press said die surfaces against the channel corners, thereby to plastically reform the channel to a final stable shape, free of the geometric irregularities.

2. The apparatus defined in claim 1, wherein said rollers are positioned in pairs distributed longitudinally along the length of said frame; said rollers of each said pair being positioned in transverse relation.

3. The apparatus defined in claim 2, wherein said rollers of each said pair are positioned in peripheral interengagement at a location transversely aligned with and intermediate the locations of peripheral engagements with an opposed two of said die elements.

4. The apparatus defined in claim 1, wherein said die includes a pair of the plates of which said die elements are loosely attached at the ends thereof, whereby said die elements are free to float during insertion of said die independently of said mandrel, such as to avoid scoring of the interior corner surfaces of the channel.

5. The apparatus defined in claim 4, wherein said rollers are positioned in pairs distributed longitudinally along the length of said frame, said rollers of each said pair being positioned in transverse relation.

6. The apparatus defined in claim 5, wherein said rollers of each said pair are positioned in peripheral interengagement at a location transversely aligned with and intermediate the locations of peripheral engagements with an opposed two of said die elements.

7. The apparatus defined in claim 6, wherein said roller pairs are positioned on all four sides of said frame, each two of said rollers positioned in transversely opposed relation on opposite sides of said frame being mounted on a common axle, said apparatus further including means mounting each said axle to said frame to position said rollers in peripheral engagement with said first bearing surfaces at room temperature and to position said rollers in non-peripheral engagement with said first bearing surfaces as said second bearing surface move into engagement with said first bearing surfaces during heating of said mandrel.

8. The apparatus defined in claim 7, wherein said mounting means includes oblong holes in said frame and bars of a lower thermal coefficient of expansion than said frame, said bars affixed to said frame in positions between said axles of transversely opposed pairs of said rollers and having journals formed in each end thereof, said bar journals and said oblong holes cooperating to provide journal mountings for said axles during insertion of said mandrel, said bars establishing said peripheral engagement and non-peripheral engagement positions of said rollers with respect to said first bearing surfaces, said rollers also being of a lower thermal coefficient of expansion than said frame.

9. The apparatus defined in claim 8, wherein said frame is of a grid-like cross-section having four intersecting sidewalls terminating in ribs extending beyond each sidewall intersection, a surface of each said rib providing said second bearing surfaces.

10. The apparatus defined in claim 9, wherein said ribs are provided with longitudinally distributed openings in said second bearing surfaces through which said rollers protrude into peripheral engagements with said first bearing surfaces.

11. Apparatus for removing geometric irregularities in an elongated, tubular channel having a plurality of substantially flat sides joined at corners to define a central passage, said apparatus comprising, in combination:
 A. a die including a plurality of elongated die elements, said die being inserted in the channel passage with one of said die elements disposed in continuous, coextensive relation with each channel corner, each said die element having
  1) a die surface confronting the contiguous one of the channel corners, and
  2) first bearing surfaces normal to the adjacent channel sides;
 B. an elongated mandrel for insertion in the channel passage, said mandrel including
  1) a frame,
  2) a plurality of rollers mounted by said frame in positions to make rolling, peripheral engagement with said first bearing surfaces during mandrel insertion, said rollers pressing said die surfaces against the channel corners to elastically reform the channel corners to elastically reform the channel in a manner to diminish the geometric irregularities, and
  3) second bearing surfaces formed on said frame in positions closely spaced relative to said first bearing surfaces during mandrel insertion; and
 C. means for expanding said mandrel to move said second bearing surfaces into engagement with said first bearing surfaces and to further press said die surfaces against the channel corners while the channel is at an elevated hot-forming temperature, thereby to plastically reform the channel to a final stable shape, free of the geometric irregularities.

12. The apparatus defined in claim 11, which further includes means for transferring the load on said mandrel exerted by the channel from said rollers to said frame as the channel is heated up to the hot-forming temperature.

13. The apparatus defined in claim 12, wherein said mandrel expanding means and said load transferring means are provided by thermally expanding said frame at a faster rate than said rollers and their the mounted positions on said frame as the channel is heated up to the hot-forming temperature.

14. The apparatus defined in claim 13, wherein said die includes a pair of tie plates to which said die elements are loosely attached at the ends thereof, whereby said die elements are free to float during insertion of said die independently of said mandrel, such as to avoid scoring of the interior corner surfaces of the channel.

15. The apparatus defined in claim 13, wherein said rollers are positioned in pairs distributed longitudinally along the length of said frame, said rollers of each said pair being positioned in transverse relation.

16. The apparatus defined in claim 15, wherein said rollers of each said pair are positioned in peripheral interengagement at a location transversely aligned with and intermediate the locations of peripheral engagements with an opposed two of said die elements.

17. The apparatus defined in claim 16, wherein said roller pairs are positioned on all four sides of said frame, each two of said rollers positioned in transversely opposed relation on opposite sides of said frame being mounted on a common axle, said load transferring means being incorporated in the mounting of said axles to said frame.

18. The apparatus defined in claim 17, wherein said load transferring means includes oblong holes in said frame and bars of a lower temperature coefficient of expansion than said frame, said bars affixed to said frame in positions between said axles of transversely opposed pairs of said rollers and having journal formed in each end thereof, said bar journals and said oblong holes cooperating to provide mountings for said axles during insertion of said mandrel.

19. The apparatus defined in claim 18, wherein said frame is of a grid-like cross-section having four intersecting sidewalls terminating in ribs extending beyond each sidewall intersection, a surface of each said rib providing said second bearing surfaces.

20. The apparatus defined in claim 19, wherein said ribs are provided with longitudinally distributed openings in said second bearing surfaces through which said rollers protrude into peripheral engagements with said first bearing surfaces.

* * * * *